United States Patent
Bird et al.

(10) Patent No.: US 7,577,444 B2
(45) Date of Patent: Aug. 18, 2009

(54) METHOD AND APPARATUS FOR INDICATING THE LOCATION OF AN OBJECT

(75) Inventors: Neil C Bird, Eindhoven (NL); Paul R. Simons, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 126 days.

(21) Appl. No.: 10/575,580

(22) PCT Filed: Oct. 12, 2004

(86) PCT No.: PCT/IB2004/052056

§ 371 (c)(1),
(2), (4) Date: Apr. 11, 2006

(87) PCT Pub. No.: WO2005/038480

PCT Pub. Date: Apr. 28, 2005

(65) Prior Publication Data

US 2007/0052534 A1    Mar. 8, 2007

(30) Foreign Application Priority Data

Oct. 15, 2003    (GB) ................................. 0324098.3

(51) Int. Cl.
*H04W 24/00*    (2006.01)
(52) U.S. Cl. .............. 455/456.2; 455/456.1; 455/456.3; 455/41.2; 455/457; 455/456.6
(58) Field of Classification Search ................ 455/456.3
See application file for complete search history.

(56) References Cited

U.S. PATENT DOCUMENTS

| | | | | |
|---|---|---|---|---|
| 6,963,283 | B1 * | 11/2005 | Gonzalez | 340/573.1 |
| 7,006,838 | B2 * | 2/2006 | Diener et al. | 455/456.1 |
| 2003/0146835 | A1 | 8/2003 | Carter | |
| 2008/0045235 | A1 * | 2/2008 | Kennedy et al. | 455/456.1 |

FOREIGN PATENT DOCUMENTS

WO    WO0106401 A1    1/2001

OTHER PUBLICATIONS

Capkun et al, "GPS-free Positioning in Mobile Ad-Hoc Networks", Proceedings of the 34th Hawaii International Conference on System Sciences, Jan. 3, 2001, pp. 1-10, XP008001836.

* cited by examiner

*Primary Examiner*—Yuwen Pan

(57) ABSTRACT

A method of indicating the location of a relatively mobile object, comprising the steps of: (a) generating a first signal that is characteristic of a first, relatively immobile object; (b) transmitting the first signal from the first relatively immobile object; (c) detecting the first signal at a receiver; (d) generating a second signal that is characteristic of a second, relatively immobile object; (e) transmitting the second signal from the second, relatively immobile object; (f) detecting the second signal at a receiver; (g) generating a third signal that is characteristic of the relatively immobile object; (h) detecting the third signal at a receiver; (i) operating a processing device operatively connected to the receiver using signal time-of-flight (t-o-f) data and/or received signal strength information (RSSI) to establish the distance of the relatively mobile object respectively from the first and second relatively immobile objects; and (j) generating a signal indicating whether the relatively mobile object is for the time being closer to the first or the second relatively immobile object as the case may be.

32 Claims, 3 Drawing Sheets

METHOD AND APPARATUS FOR INDICATING THE LOCATION OF AN OBJECT

This invention relates to a method and apparatus for indicating the location of a relatively mobile object relative to a relatively immobile object. Apparatus for indicating in this manner is sometimes called an "object location system".

It is known to use e.g. radio frequency ("RF") signals to assist in the location of objects requiring tracking or locating. One approach in this art involves the positioning of beacons that are capable of communicating with a processor forming part of a base station. Such beacons communicate using e.g. known Bluetooth™ technologies or radio frequency identification ("RFID") tagging.

The beacons require careful placing, or at least accurate position logging after placing.

A beacon-based object location apparatus provides the range (distance) of a detected object from a fixed beacon. In a two-dimensional space this resolves to an unknown point on a circle centred about one fixed beacon. When two beacons detect an object, the position resolves to two points where the beacons intersect. Three beacons allow range measurements to be converted into a single position. Techniques such as triangulation allow such range measurements, with errors to be converted into position.

The problem with using signal strength is that received power diminishes by $1/r^2$ under free space conditions but indoors it can be much worse (e.g. $1/r^3$) due to effects such as "multipath". In other words, range measurements are much more accurate when performed close to a beacon than when the beacon is far away. Since as noted hereinabove use of signal strength values alone, to establish object location, is sub-optimal, known RSSI algorithms have been adapted to make use of the strongest received signal. They are also adapted to handle a number of different cases depending upon how many beacons are detected. For the purposes of the following explanation 2 dimensional measurements are assumed.

1 Beacon Solution

As shown in FIG. 1 a line (of infinite length) is drawn along the axis from the last predicted position $(x_p, y_p)$ to the centre of the beacon $(x_c, y_c)$. This intersects with a circle drawn at the measured range r at 2 places. The closest point of intersection to the last predicted position is the new predicted position.

The circle whose equation is:

$$(x-x_0)^2+(y-y_0)^2=r^2$$

and the line equations (1):

$$y=mx+b$$

where:

$$m=(y_c-y_p)/(x_c-x_p)$$

and $$b=(y_p-x_p(y_c-y_p))/(x_c-x_p)$$

meet at the points for equations (2):

$$x = \frac{my_0 + x_0 - mb}{m^2 + 1} \pm \frac{\sqrt{r^2 - ((y_0 - mx_0 - b)/\sqrt{1+m^2})^2}}{\sqrt{1+m^2}}$$

$$y = \frac{m^2 y_0 + mx_0 + b}{m^2 + 1} \pm \frac{\sqrt{r^2 - ((y_0 - mx_0 - b)/\sqrt{1+m^2})^2}}{\sqrt{1+m^2}}$$

The foregoing sequence of steps is referred to herein as a "1-beacon RSSI determination".

2 Beacon Solution

As shown in FIG. 2, circles are drawn from the centres of the beacons at the measured range from each beacon. These intersect at two points. The closest point to the current predicted position is the new predicted position.

Given the two circles whose equations are:

$$(x-x_1)^2+(y-y_1)^2=r_1^2$$

$$(x-x_2)^2+(y-y_2)^2=r_2^2$$

their intersection points are given by equations (3):

$$x = \frac{x_2 + x_1}{2} + \frac{(x_2 - x_1)(r_1^2 - r_2^2)}{2d^2} \pm$$
$$\frac{y_2 - y_1}{2d^2}\sqrt{((r_1+r_2)^2 - d^2)(d^2 - (r_2-r_1)^2)}$$

and $$y = \frac{y_2 + y_1}{2} + \frac{(y_2 - y_1)(r_1^2 - r_2^2)}{2d^2} \pm$$
$$\frac{x_2 - x_1}{2d^2}\sqrt{((r_1+r_2)^2 - d^2)(d^2 - (r_2-r_1)^2)}$$

where $$d = \sqrt{(x_2-x_1)^2 + (y_2-y_1)^2}$$

This sequence of steps is referred to herein as a "2-beacon RSSI determination".

3 or More Beacon Solution

This is illustrated in FIG. 3. Using the two beacons with the longest range their intersection points are found using equations (3). These two points are used to form a line of infinite length using equations (1). The closest point to the last predicted position, where the lines intersect with the circle formed at the measured ranged from the centre of the closest beacon, is the new predicted position. This can be calculated from equation (2). This provides the most accurate solution of the three under consideration.

This sequence of steps is referred to herein as a "3+-beacon RSSI determination".

The accuracy of beacon-based object location systems is limited by the transmission ranges of the beacons, which are typically 10-30 m. Therefore to provide for object location in a large or complexly shaped space (such as a home) would require several beacons. The need accurately to place and/or log the locations of such beacons is a strong disincentive to using the beacon-based apparatuses for home use.

There are techniques for improving the accuracy of beacon-based apparatuses.

One involves the use of signal strength detection, whereby based on a comparison of signal strength values received at the processor it is possible to estimate the distance of a "target" object from a beacon.

However, signal strength values are not ideal for this purpose because reflections, nulls and interruptions in the signal path render the distance estimates inaccurate. Such signal defects typically are caused e.g. by building walls and other objects.

The incorporation of so-called "fingerprinting" as a step in setting up a beacon-based apparatus improves its accuracy to some extent.

Another technique that can derive range from a beacon involves the measurement of the time-of-flight ("tof") of the signals received at the processor.

The tof techniques require an ability to measure times of signal flights to nanosecond accuracy. This is difficult to achieve.

In indoor environments the generation of multipaths (i.e. time-shifted echo signals caused by reflection of transmitted signals e.g. from surfaces) is a significant problem when using tof-based methods. It is necessary for any distance estimating software to include algorithms to compensate for the effects of multipaths.

Ultrawideband ("UWB") methods are being developed. These are less sensitive to the effects of multipaths.

Nonetheless it is a disadvantage of all presently known object location systems that the infrastructure and setting up requirements are too complicated to appeal to the typical, domestic user. All the known apparatuses require the establishment of the beacons and a step of allowing the apparatus to calculate the distance of the processor, a display device or another device serving as a base station, from each beacon; and in many cases the labelling, in a memory connected to the base station, of the beacons.

FIG. 4 summarises the accuracy and range of operation characteristics of various methods that in principle are suitable for use in object locating apparatuses. As illustrated by FIG. 4, however, those methods offering good location accuracy are associated with prohibitive infrastructure requirements; yet those whose infrastructure requirements are more reasonable for domestic use either fail to offer the accuracy needed to locate easily lost domestic items such as keys, building passes and mobile telephones; or they are accurate only over distances that are too short to be of practical benefit.

WO-A-01/06401 discloses an arrangement in which tof measurements are employed to establish the distance of a so-called tagged object (i.e. an object to be located) from a so-called "tag reader". However in this arrangement the tag reader must be at a fixed location in order for the apparatus to function.

WO-A-01/06401 also discloses the use of signal strength determinations in object location techniques. However WO-A-01/06401 recognises the reduced accuracy available using signal strength evaluations.

Assuming that a solution to the drawbacks of prior art arrangements involves the use of RF signals, the specific problems that remain unsolved in the prior art include:

1. Measuring Ranges.
   As noted, accurately measuring the distance between two devices, in a home environment, can be difficult.
2. Converting Ranges to x,y,z Coordinates.
   Typically the range measuring mechanism is used to measure the distance from the device to be located, to a number of fixed nodes (base stations) situated around the home. Three or more base stations are required for this, depending on the detail of the ranging method employed. Once the measurements have been taken, techniques such as triangulation are then required to calculate the coordinates of the device to be located relative to the locations of the fixed nodes.

3. Converting x,y,z Coordinates to a Logical or Contextual Position.
   Once the coordinates are known, these need to be converted to a location definition in terms that the user understands. An example is "Under the chair you were sitting on last night". In order to do this, the system needs to have some knowledge of the environment.

Only when a system is able to carry out each of the above three operations, will it perform a useful indoor positioning function. However, there are two key disadvantages of this approach in indoor positioning, namely:

Setting Up of the Beacons.
   The first stage of setting up the positioning system is to locate a number of beacons around the home. These should not be co-located, but placed at distributed positions around the home to improve the geometry of the positioning solution. Once the beacons have been positioned, their locations must be accurately determined relative to a fixed point in the home.

Mapping of the Home Space.
   This is required as noted under 3. above. With the beacons in place, an apparatus can calculate x,y,z coordinates, but it will not automatically relate the co-ordinates to other items in the home. This is important as it is the usual way that humans find objects:

"Where are the car keys?"
"On the kitchen table"
is a typical interrogation and response carried out by humans.

In order to replicate such an approach, an object location apparatus must include a map of the home (in the same way that an in-car GPS apparatus uses a CD-based map to convert longitude and latitude to road/town details).
   Even when such a map of the home space exists, it will need constant updating as objects move around the home.

It is an aim of the invention to provide a solution to the indoor positioning problem in which: (i) the user does not need to set up a number of beacons around the home and measure their positions, and (ii) there is no need to map the home space.

According to a first aspect of the invention there is provided a method of indicating the location of a relatively mobile object, comprising the steps of:

(a) generating a first signal that is characteristic of a first, relatively immobile object;
(b) transmitting the first signal from the first relatively immobile object;
(c) detecting the first signal at a receiver;
(d) generating a second signal that is characteristic of a second, relatively immobile object;
(e) transmitting the second signal from the second, relatively immobile object;
(f) detecting the second signal at a receiver;
(g) generating a third signal that is characteristic of the relatively immobile object;
(h) detecting the third signal at a receiver;
(i) operating a processing device operatively connected to the receiver using signal time-of-flight (t-o-f data and/or received signal strength information (RSSI) to establish the distance of the relatively mobile object respectively from the first and second relatively immobile objects; and
(j) generating a signal indicating whether the relatively mobile object is for the time being closer to the first or the second relatively immobile object as the case may be.

This method offers an efficacious solution to the drawbacks of the prior art, because the use of two relatively immobile objects obviates the need accurately to map the space in which the relatively mobile object exists. On the contrary, using the method of the invention it is necessary simply to be able to distinguish between the signals generated by the three objects. Such a situation is easy for the home user to effect, for example by using uniquely coded, self-adhesive transponders in the manner described in more detail below.

Thus the method of the invention preferably but not necessarily includes the step of, before carrying out Step (a):

(k) locating on each of the relatively mobile and first and second relatively immobile objects a respective portable transmitter that is capable of generating and transmitting a said signal that is characteristic of the object on which it is located.

The ability to combine tof and signal strength measurements in the method of the invention further improves the accuracy of the object location.

Conveniently the method includes, after carrying out Step (k):

(l) supplying, via an input device, data to the processing device that associates each said portable transmitter with the object on which it is located.

The data may for example include a verbal identifier, or a code. The base station or another processing device operatively associated with the apparatus used to carry out the method of the invention may include e.g. software for converting such a code to a format that a user would readily recognise, ready for outputting to the user.

Preferably Step (j) includes assessing data supplied to the processing device whereby the signal indicating whether the relatively mobile object is for the time being closer to the first or the second relatively immobile object includes data identifying:

(1) the relatively mobile object; and
(2) the relatively immobile object to which it is closer/closest.

This sequence of steps advantageously allows the outputting of data, about the location of an object, that is "intuitive", i.e. readily understandable to the user.

Preferably Step (i) includes determining the signal tof data by obtaining timing information between first and second devices using the steps of:

transmitting a timing signal from the first device to the second device at a time t1 relative to the local clock of the first device and measuring the time of arrival t2 of that signal at the second device relative to the local clock of the second device;

transmitting a timing signal from the second device to the first device at a time t3 relative to the local clock of the second device and measuring the time of arrival t4 of that signal at the first device relative to the local clock of the first device; and assembling the values of t1, t2, t3 and t4 in a single device.

Conveniently Step (i) additionally or alternatively includes: a 1-beacon, 2-beacon or 3+-beacon RSSI determination.

It is very desirable when the method of the invention is used to locate easily lost, household objects, for the use of the method to be simple and straightforward for the user to understand.

Therefore Step (j) of the method of the invention includes carrying out a contextual conversion using a look-up table stored in a memory device to interpret co-ordinates corresponding to the locations of the said objects, and generating one or more messages indicative of the identity of one or more said objects.

In a particularly preferred embodiment of the invention Step (k) includes adhering a portable transmitter to each respective object, using an adhesive material.

This sub-step helps to render the method of the invention convenient for a domestic user to carry out.

Step (j) also preferably includes:

(m) activating each said portable transmitter from a deactivated state.

Even more preferably Step (m) includes:

(n) removing each said portable transmitter from a storage location, interaction between each portable transmitter and the storage location maintaining it in the deactivated state and the said removing causing the said activation.

Thus the method permits the long term storage and/or shipping of the portable transmitters, in a deactivated state, until it is necessary to activate them.

Conveniently Step (l) includes entering data via one or more of a keyboard, a keypad or a voice recognition device operatively connected to the processing device.

Conveniently the method includes, before carrying out Step (l):

(o) prompting a user as to the class of data, selected from a set of classes, requiring inputting.

The set of classes may for example include:
relatively mobile objects;
relatively immobile objects; and
base stations.

Therefore the method of the invention advantageously allows a user to "tag" easily lost (relatively mobile) objects; and relatively immobile objects, using language that is easy to follow.

The method of the invention preferably includes, before Step (j):

(p) interrogating via an input device the processing device as to the location of a said relatively mobile object. Even more preferably the method Step (p) includes interrogating the processing device via one or more of a keyboard, a keypad or a voice input device operatively connected to the receiver.

The foregoing steps of the method conveniently allow practising of the method using apparatuses, such as DECT (Digital Electronic Cordless Telephone) telephones and/or personal computers, that increasingly are found in home environments.

Preferably Step (j) also includes transmitting or displaying a message to a user via one or more of a display screen or a speech synthesiser that is operatively connected to the processing device.

According to a second aspect of the invention there is provided apparatus for indicating the location of a relatively mobile object, comprising:

two or more first portable transmitters that are capable of generating and transmitting signals each characteristic of a respective relatively immobile object, the first portable transmitters each being locatable on a said relatively immobile object;

one or more second portable transmitters that are capable of generating and transmitting signals each characteristic of a said relatively mobile object, the or each second portable transmitter being locatable on a respective said relatively mobile object;

a receiver that is capable of receiving the signals generated by the transmitter;

a processing device that is capable of establishing, using signal t-o-f data and/or RSSI, the distance of a said second transmitter, located on a said relatively mobile object, from each of two said first transmitters located on respective said relatively immobile objects; and a signal generator capable of generating a signal indicative of the said first transmitter to which the said second portable transmitter is for the time being closer/closest.

Such apparatus is particularly suited to carrying out steps of the method of the invention.

Preferably the apparatus includes an input device for inputting to the processing device data that associate each portable transmitter with the object on which it is located. Conveniently the input device includes one or more of a keyboard, a keypad or a voice input device operatively connected to the processing device.

The foregoing features allow the apparatus readily to form part of apparatus, such as a DECT telephone network or personal computer, that a user is likely to possess.

Conveniently the processing device is programmable and is programmed to establish the distance of a said second transmitter from each of said first transmitters, obtaining timing information between first and second devices using the steps of:

transmitting a timing signal from the first device to the second device at a time t1 relative to the local clock of the first device and measuring the time of arrival t2 of that signal at the second device relative to the local clock of the second device;

transmitting a timing signal from the second device to the first device at a time t3 relative to the local clock of the second device and measuring the time of arrival t4 of that signal at the first device relative to the local clock of the first device; and assembling the values of t1, t2, t3 and t4 in a single device.

One embodiment involves device A measuring the Time-of-Flight from device B. Device B sends a known signal to device A, and includes a Timestamp to mark the time at which it was transmitted. Device A generates a local replica of the known signal, and correlates it with the signal received from device B. This correlation is achieved through Device A shifting its local replica in time until it matches with the signal received from device B, at which point it knows the Time-of-Arrival. It subtracts the Time-of-Transmission denoted by the Timestamp to give the Time-of-Flight. This assumes the clocks in device A and B are synchronized.

Additionally or alternatively the processing device is programmable and is programmed to establish the distance of a said second transmitter from each of said first transmitters, according to a 1-beacon, 2-beacon or 3+-beacon RSSI determination.

A RSSI measurement is typically the voltage of the signal that has been received, amplified and converted into a integer number by a ADC. One embodiment that allows this RSSI measurement to be converted to range is using a lookup table. Under representative conditions measurements can be made of received RSSI values against ranges of 1 m intervals from 0 m to the furthest range of detection from a fixed beacon. This sampled data can be compiled into a lookup table allowing range to be derived from an RSSI measurement.

Preferably the apparatus includes an adhesive material for adhering each said portable transmitter to a respective said object. It is also preferable that each said portable transmitter includes the adhesive material permanently secured thereto so as to present an adhesive surface for securing the transmitter to a said object. These simple measures advantageously improve the utility of the apparatus.

Conveniently each said transmitter is switchable between a deactivated (non-transmitting) and an activated (transmitting) state. More preferably the apparatus includes a storage member for storing thereon each portable transmitter at least before first use, the storage member and the transmitter co-operating to maintain the transmitter in its deactivated state until its removal from the storage member on first use. Even more preferably the adhesive surface temporarily secures each transmitter to the storage member at least before first use of the transmitter.

In a preferred embodiment of the invention the storage member is or includes a flexible sheet to which each transmitter is secured before first use. The storage member also preferably includes a respective member that co-operates with each said transmitter stored thereon before first use in order to maintain the deactivated state of the said transmitter.

The foregoing features assure that the transmitters do not become prematurely activated. This prolongs their useful lives and those of any portable energy sources (such as batteries) forming part of the apparatus of the invention.

Preferably the apparatus includes an output device operatively connected to the processing device.

More preferably the processing device is programmable and is programmed to generate a prompt as to data requiring entry via the data entry device and as appropriate display or transmit the prompt via the output device.

In embodiments of the invention the output device is or includes one or more of a display screen or a speech synthesiser; and the processing device is programmable and is programmed to carry out a contextual conversion on data indicative of the said first transmitter to which the second transmitter is for the time being closer/closest.

The foregoing features advantageously permit ready inputting of data and, more specifically, the outputting of object location information, via the apparatus.

There now follows a description of preferred embodiments of the invention, by way of non-limiting example, with reference being made to the accompanying drawings in which.

Figure 5:
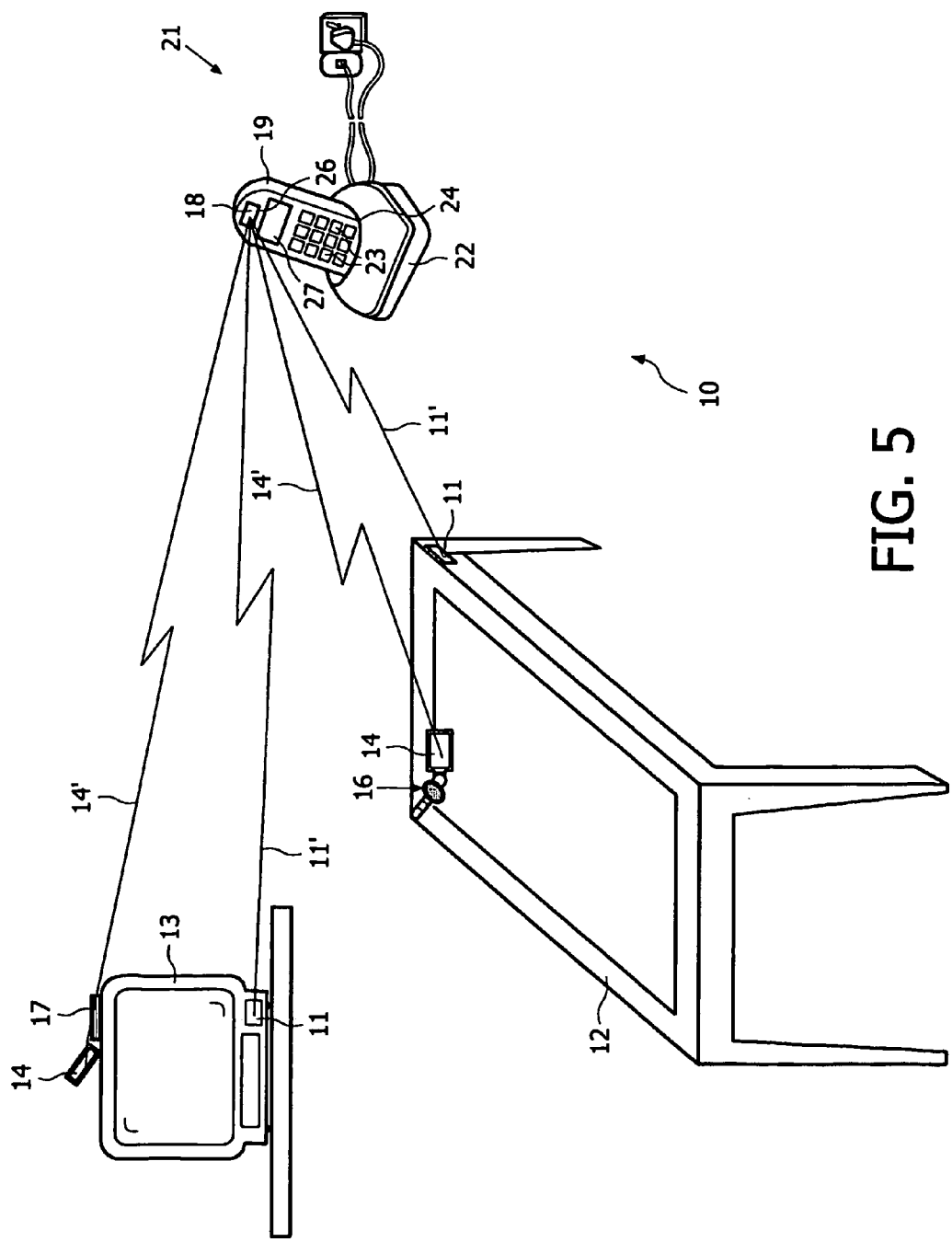
FIG. 5 is a schematic representation of apparatus according to the invention.

Referring to FIG. 5, an apparatus 10 for indicating the location of a relatively mobile object relative to a relatively immobile object includes at least two first portable transmitters 11. Each first portable transmitter 11 is capable of generating and transmitting signals that are each characteristic of a respective, relatively immobile object.

The first, portable transmitters 11 are each locatable on a relatively immobile object. In FIG. 5 two of the first, portable transmitters 11 are shown secured respectively on a table 12 and a television 13, each of which is an object that a householder moves only very infrequently (if at all). The transmitters 11 are locatable on any of a large number of relatively immobile objects such as but not limited to items of furniture; so-called "white goods"; filing cabinets; warehouse shelving; telephones; fixtures such as window sills and doorways; and office equipment such as photocopiers. Any number, greater than unity, of the first transmitters is theoretically possible within the scope of the invention.

The apparatus 10 also includes at least one or more second portable transmitters 14 that are each capable of generating and transmitting signals that are respectively characteristic of a relatively mobile object, on which each such second, portable transmitter is locatable (i.e. securable).

In the embodiment shown in FIG. 5 a first such relatively mobile object is a first set of car keys 16, although it could be any of a very wide range of easily lost objects, or objects that are frequently moved and hence require tracking. Examples include but are not limited to keys other than for cars; sunglasses; wallets/purses; mobile telephones (which are easily lost when switched off); building passes and so-called "swipe" cards; passports; driving licences; cameras; portable, plug-in memory devices; MP3 and similar digital audio format players; children's toys and school equipment; and remote controllers e.g. for audio and video equipment and powered doors/gates.

In FIG. 5 there is also shown a further, second portable transmitter 14 secured in the example shown to a second set 17 of car keys, although the or each further second portable transmitter is locatable on a similar range of objects as that exemplified above.

For ease of explanation the keys 16 are henceforth referred to as "the Jaguar keys"; and the keys 17 as "the Micra keys". The registrations of the trade marks "Jaguar" and "Micra" are hereby acknowledged.

The apparatus 10 additionally includes a receiver that in the preferred embodiment shown is a transceiver 18 that is capable of receiving the signals generated by the transmitters 11, 14. The respective signals are represented schematically by lines 11✻ (which refer to the signals from the transmitters 11) and 14✻ (which signify the signals from the transmitter 14).

In the embodiment shown the transceiver 18 is secured to or otherwise operatively associated with the handset 19 of a DECT apparatus 21 that includes a base station 22.

This is because a DECT apparatus includes as a matter of routine a series of sub-components of the apparatus of the invention, and that are described hereinbelow.

However, the receiver of the invention may in the alternative be secured or otherwise operatively connected to any of a range of other devices (such as for example personal computers, audio or video/TV equipment; game consoles, or even kitchen equipment such as microwave ovens and refrigerators); or it may be embodied as a discrete unit or series of functionally interconnected sub-units.

Furthermore the receiver need not be embodied as part of a transceiver, but may instead be a discrete subcomponent.

Regardless of the precise implementation of the receiver, the apparatus 10 includes a processing device (that is not shown in FIG. 5 by reason of lying within the housing of DECT handset 19 or base station 22) operatively connected to the receiver 18.

The processing device is capable of establishing, using signal tof data and/or RSSI, the distances of each of the second transmitters 14 from each of at least two of the first transmitters 11 located on the relatively immobile objects 12, 13.

The apparatus 10 also includes a signal generator.

In FIG. 5 the signal generator is operatively connected to and located adjacent transceiver 18, although in other embodiments of the invention a discrete transmitter is possible.

The signal generator is in the preferred embodiment operatively connected to the processing device within the housing of handset 19, but in other embodiments different connection and positioning arrangements are possible and within the scope of the invention.

The signal generator is capable of generating a signal that is indicative of the identity of the said first, portable transmitter to which a selected said second, portable transmitter is, for the time being, closer.

The DECT handset 19 includes in practice two input devices (the keypad 23 and microphone 24) by one, or in some embodiments, both, of which a user may enter data pertaining to the objects to which the transmitters 11, 14 are secured. Using one or more such devices a user can enter data indicative of the identity of each said object. By reason of the input device(s) being operatively connected to the processing device it is thereby possible uniquely to associate each transmitter 11, 14 with such an object.

When, as in the embodiment shown, the processing device is part of a DECT handset input of such data is as implied by way of a keypad 23 and/or a microphone 24 that provides data to the processing device e.g. following conditioning in a speech recognition device.

In another embodiment of the invention the data input may occur via a keyboard forming part of e.g. a personal computer or a TV-internet apparatus.

Regardless of how the input device is, in practice, arranged, the processing device is programmable and is programmed to carry out a signal tof method that, broadly, may be defined as obtaining timing information between first and second devices using the steps of:

transmitting a timing signal from the first device to the second device at a time t1 relative to the local clock of the first device and measuring the time of arrival t2 of that signal at the second device relative to the local clock of the second device;

transmitting a timing signal from the second device to the first device at a time t3 relative to the local clock of the second device and measuring the time of arrival t4 of that signal at the first device relative to the local clock of the first device; and assembling the values of t1, t2, t3 and t4 in a single device.

In practice of course the first "device" is one of the transmitter 11,14; and the second "device" is the base station transceiver/processor combination 18.

The programmable device also is programmed to carry out a 1-beacon, 2-beacon or 3-beacon RSSI determination as defined herein.

An important feature of the invention, in making it easy for domestic users to employ, is that the portable transmitters must be small, light in weight and easy to apply to the various objects.

Consequently each transmitter includes permanently secured thereto on an exterior surface a layer of adhesive material whereby it is readily possible to attach the transmitters to the objects.

The transmitters are supplied to the user in a deactivated condition and are switchable to an activated condition when it is required to operate the apparatus.

One preferred way of achieving this is to provide the transmitters as small (e.g. postage stamp-sized) flexible laminae that are peelable (by way of characteristics of the adhesive layers providing for temporary adhesion of the transmitters) from e.g. a flexible or rigid backing sheet to which the transmitters are electrically connected. In the un-peeled condition the capacitance and/or resistance of the backing sheet may be used to hold a transmitter switch (e.g. a resonant circuit) in a non-transmitting configuration.

Thus the backing sheet may constitute a storage member for storing the transmitters before first use, with the storage member and the transmitter co-operating to maintain the "off" condition of the transmitters until the user removes them from the sheet.

The processing device has operatively associated therewith an output device. When as shown the processing device is part of a DECT apparatus 21 the output device may take either or both of two forms.

More specifically the output device may be embodied as e.g. a speech or tone synthesiser that transmits audible messages, especially spoken messages or meaningful tones, via a loudspeaker 26; or it may be a visible display such as that exemplified by reference numeral 27.

In some embodiments of the invention, combinations of output devices may be useful.

For example in response to the interrogation, "Where are the Jaguar keys?" (which may be entered e.g. via keypad 23 or microphone 24 driving speech recognition software) the apparatus 10 of the invention may be programmed to respond by transmitting, via loudspeaker 26, the reply, "The Jaguar keys are on the table".

At the same time the display 27 could display the word "TABLE" as a reminder.

If the user then moves handset 19, the loudspeaker might emit, under control of the processing device, a series of tones that meaningfully indicate (e.g. through variations in frequency and/or timing) whether handset 19 is being moved closer to or further away from the Jaguar keys.

Another important aspect of the invention concerns so-called "contextual conversion". As implied hereinabove this is a technique whereby mathematical data defining the position of one of the relatively mobile objects are converted into messages that are meaningful to the user.

In this regard, a mathematical output defining co-ordinates is of no help to the user, since he cannot relate the co-ordinates to the space surrounding him.

Similarly a message such as "The Jaguar keys are near the Micra keys" is of limited benefit since it relates the (unknown) location of one moveable object to the (probably unknown) location of another.

The most helpful messages that the system generates are those relating the location of a selected, moveable object to that of one of the relatively immobile objects.

This is a primary aim of the contextual conversion programme embodied in the processing device.

A subsidiary aim is that of identifying over time, those objects which are capable of moving; and those which are relatively immobile. Through such a technique the software is able to avoid giving unhelpful messages such as, "The Jaguar keys are next to the Micra keys". Therefore the programming of the processor preferably includes adaptive learning functions.

Figure 1:
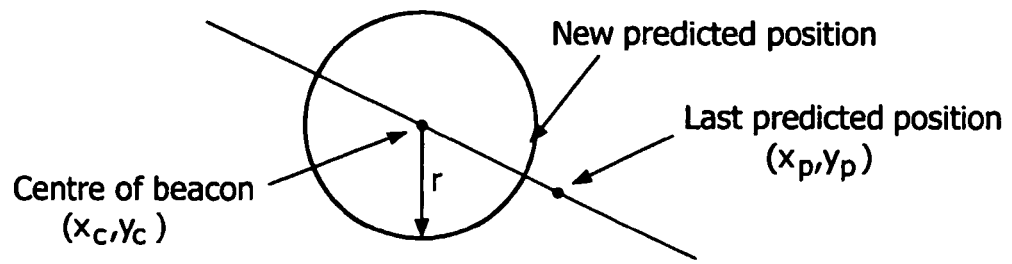
FIG. 1 shows, schematically, a per se known method of locating an object, using a single beacon.
Figure 2:
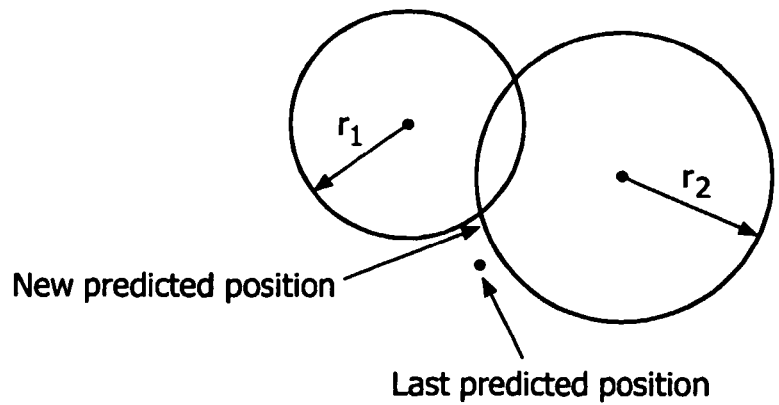
FIG. 2 illustrates such a method using two beacons.
Figure 3:
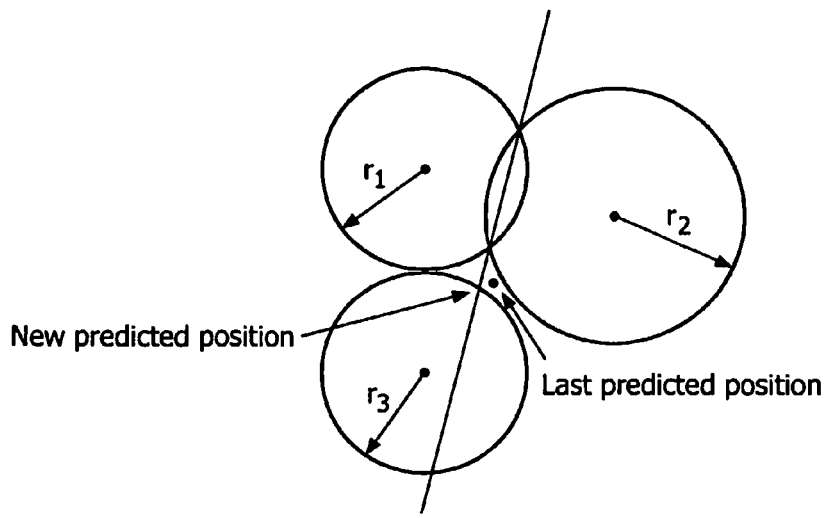
FIG. 3 illustrates such a method using three or more beacons.
Figure 4:
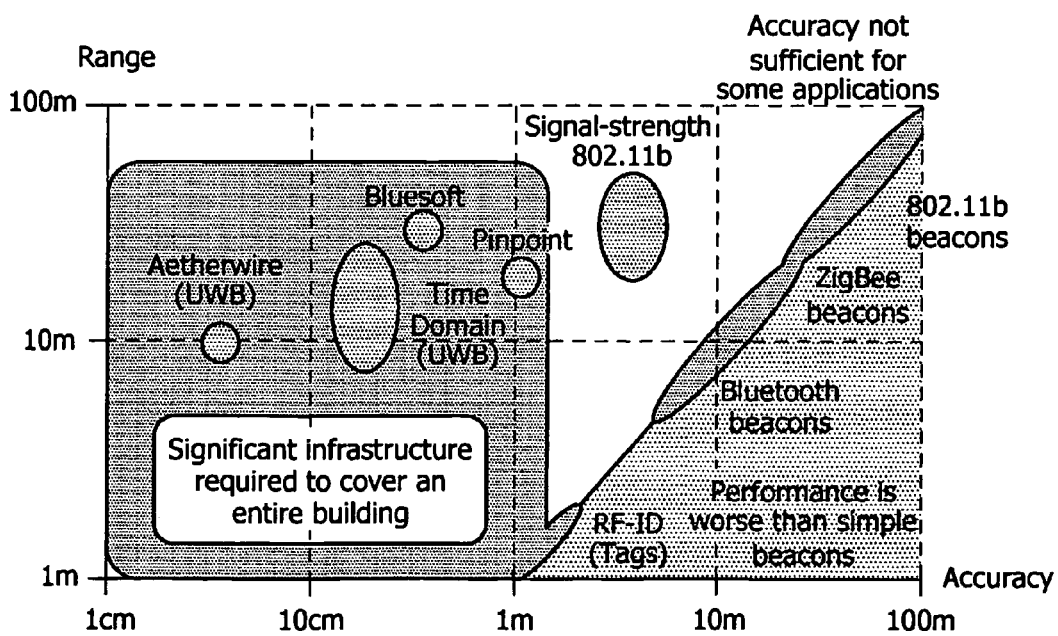
FIG. 4 is a plot representing schematically the compromises evident in the use of prior art methods for locating and/or tracking objects, especially in domestic environments.

The following describes one of several possible setting-up and operational routines of the apparatus 10 shown in FIG. 2.

Switching on of the portable transmitters could be achieved by a connection that is broken when each one is removed from the book or other storage medium. The transmitter periodically sends a radio signal that includes a unique code that is programmed into the transmitter. When this code is received by the receiver 18 in the DECT apparatus 21, the processor realises that the code is new and unknown and asks the user to type in the name of the object to which the transmitter is to be attached, using an SMS type of interface 23. The processor then adds a unique ID and the type name to its internal database. This registration process is repeated for a desired number of objects. The base station and the other DECT chargers may also count as objects in this sense.

Typically, the DECT base station 22 will be in e.g. a living room of the user's house, and additional DECT handsets and chargers, in the kitchen and a bedroom. However, the exact locations are not important in this description.

The first and second portable transmitters 11, 14 resemble self-adhesive stamps stored e.g. on a backing sheet or as the tearable pages of a booklet. The first and second transmitters may each be of the same design if desired. The user tears them out as desired and sticks one on each item whose position it is required to track; and on each relatively immobile object.

On the DECT display 27, a message appears: "What is this tag going to be attached to?". The user then types (using the SMS style interface 23 forming part of the handset) the name of the device that the tag will be fixed to, e.g. "Television in living room"; "Refrigerator"; "Jaguar keys"; "Micra keys" and so on.

The user attaches the transmitter to the object he has just named.

The identity of object is then logged in the processor memory and its position can be calculated. The foregoing steps are repeated for each object to be included in the system.

The programming of the processor permits the addition of objects to the processor memory at a later time, by repeating the method steps.

The apparatus is now ready for use. The process of locating an object comprises two steps, with the second of these being optional. To locate an object, the user picks up one of the handsets, and asks for the location of an object, e.g. "Where are the Jaguar keys?". The system then works out where the keys are (according to a process outlined below), and responds using synthesised speech: "Next to the television in living room". If a second stage of search assistance is required, the user takes the handset and starts searching for the object. During this step the handset emits a series of audible tones ("beeps"). As the user gets closer to the object, the handset beeps faster or in another meaningful way (i.e. a kind of "hotter/colder" indication).

During the first stage of location finding the receiver 18 listens for signals from all of the objects in its data base and logs the signal strength and/or measures the time-of-flight of the RF signal (or some other measured RF parameter that is indicative of distance) from each received by the base station and the chargers. This time-of-flight and/or signal strength information is then compared with the same information for other objects in the database—see Table 1 below. In this way, the system is then able to work out whether the object to find is close to any of the other objects in the database. This will be the case if the object to find is generating a similar set of signals (time-of-flight, signal strength) as another object. Once the system has worked out which other object the "target" object is close to, it can then report the position in the form of a (spoken) message along the lines of "The Jaguar keys are close to/on the dining room table".

TABLE 1

| Example RSSI and Time-of-Flight Measurements | | |
| --- | --- | --- |
| ID | RSSI | Time-of-Flight |
| Dining room table | 40 | 68 |
| TV | 25 | 24 |
| TV/video combo | 76 | 123 |
| Micra keys | 42 | 74 |
| Jaguar keys | 38 | 60 |

Table 1 exemplifies some RSSI and tof values calculated during such a determination.

The invention claimed is:

1. A method of indicating the location of a relatively mobile object, comprising the acts of:
   (a) generating a first signal that is characteristic of a first, relatively immobile object;
   (b) transmitting the first signal from the first relatively immobile object;
   (c) detecting the first signal at a receiver;
   (d) generating a second signal that is characteristic of a second, relatively immobile object;
   (e) transmitting the second signal from the second, relatively immobile object;
   (f) detecting the second signal at the receiver;
   (g) generating a third signal that is characteristic of the relatively mobile object;
   (h) detecting the third signal at the receiver;
   (i) operating a processing device operatively connected to the receiver using signal time-of-flight (t-o-f) data and/or received signal strength information (RSSI) of the first, second and third signals received by the receiver to establish a distance of the relatively mobile object respectively from the first and second relatively immobile objects; and
   (j) generating a signal indicating whether the relatively mobile object is closer to the first or the second relatively immobile object.

2. The method according to claim 1 including the act of, before carrying out the act (a):
   locating on each of the relatively mobile and the first and second relatively immobile objects a respective portable transmitter that is capable of generating and transmitting said first signal and said second signal.

3. The method according to claim 2 including, after carrying out the locating act:
   the act of supplying, via an input device, data to the processing device that associates each said portable transmitter with the object on which it is located.

4. The method according to claim 3 wherein the act (j) includes assessing data supplied to the processing device whereby the signal indicating whether the relatively mobile object is closer to the first or the second relatively immobile object includes data identifying:
   (1) the relatively mobile object; and
   (2) at least the relatively immobile object to which the relatively mobile object is closer.

5. The method according to claim 3, wherein the act of supplying includes entering data via one or more of a keyboard, a keypad or a voice input device operatively connected to the processing device.

6. The method according to claim 3 including, before the act of supplying:
   prompting a user as to a class of data, selected from a set of classes, requiring inputting.

7. The method according to claim 6 wherein the set of classes includes at least:
   relatively mobile objects;
   relatively immobile objects; and
   base stations.

8. The method according to claim 2, wherein the act locating includes adhering a portable transmitter to each respective object, using an adhesive material.

9. The method according to claim 2, wherein the act (j) includes:
   activating each said portable transmitter from a deactivated state.

10. The method according to claim 9 wherein the act activating includes:
    removing each said portable transmitter from a storage location, interaction between each portable transmitter and the storage location maintaining it in the said deactivated state and the said removing causing the said activation.

11. The method according to claim 1 wherein the act (i) includes determining the signal t-o-f data by obtaining timing information between first and second devices using the acts of:
    transmitting a first timing signal from the first device to the second device at a first time t1 relative to a local clock of the first device and measuring a first time of arrival t2 of the first timing signal at the second device relative to a local clock of the second device;
    transmitting a second timing signal from the second device to the first device at a second time t3 relative to the local clock of the second device and measuring a second time of arrival t4 of the second timing signal at the first device relative to the local clock of the first device; and
    assembling the values of t1, t2, t3 and t4 in a single device.

12. The method according to claim 1 wherein the act (i) includes a 1-beacon, 2-beacon or 3+-beacon RSSI determination.

13. The method according to claim 1 wherein the act (j) includes:
    carrying out a contextual conversion using a look-up table stored in a memory device to interpret co-ordinates corresponding to locations of the said objects, and generating one or more messages indicative of identity of one or more said objects.

14. The method according to claim 1 including, before the act (j):
    interrogating via an input device the processing device as to the location of a said relatively mobile object.

15. The method according to claim 14 wherein the act of interrogating includes interrogating the processing device via one or more of a keyboard, a keypad or a voice recognition device operatively connected to the receiver.

16. The method according to claim 1 wherein the act (j) includes transmitting or displaying a message to a user via one or more of a display screen or a speech synthesiser that is operatively connected to the processing device.

17. The system according to claim 1 wherein the processing device is programmable and is programmed to carry out a contextual conversion on data indicative of the said first relatively immobile object or second relatively immobile object to which the relatively mobile object is closer.

18. A system for indicating a location of a relatively mobile object, comprising:
    a first portable transmitter that is capable of generating and transmitting a first signal characteristic of a first relatively immobile object, the first portable transmitter being locatable on said first relatively immobile object;
    a second portable transmitter that is capable of generating and transmitting a second signal characteristic of a second relatively immobile object, the second portable transmitter being locatable on said second relatively immobile object;
    a third portable transmitter that is capable of generating and transmitting a third signal characteristic of said relatively mobile object, the third portable transmitter being locatable on said relatively mobile object;
    a receiver that is capable of receiving the first, second and third signals;

a processing device that is capable of establishing, using signal t-o-f data and/or RSSI of the first, second and third signals received by the receiver, a distance of the relatively mobile object respectively from the first and second relatively immobile objects; and a signal generator capable of generating a signal indicating whether the relatively mobile object is closer to the first or the second relatively immobile object.

19. The system according to claim 18 including an input device for inputting to the processing device data that associates each portable transmitter with the object on which it is located.

20. The system according to claim 19 wherein the input device includes one or more of a keyboard, a keypad or a voice input device operatively connected to the processing device.

21. The system according to claim 19 including an output device operatively connected to the processing device.

22. The system according to claim 21 wherein the processing device is programmable and is programmed to generate a prompt as to data requiring entry via the data entry device and as appropriate display or transmit the prompt via the output device.

23. The system according to claim 21 wherein the output device includes one or more of a display screen or a speech synthesiser.

24. The system according to claim 18 wherein the processing device is programmable and is programmed to establish the distance, by obtaining timing information between first and second devices using the acts of:

transmitting a first timing signal from the first device to the second device at a first time t1 relative to a local clock of the first device and measuring a first time of arrival t2 of the first timing signal at the second device relative to a local clock of the second device;

transmitting a second timing signal from the second device to the first device at a second time t3 relative to the local clock of the second device and measuring the time of arrival t4 of the second timing signal at the first device relative to the local clock of the first device; and assembling the values of t1, t2, t3 and t4 in a single device.

25. The system according to claim 18 wherein the processing device is programmable and is programmed to establish the distance according to a 1-beacon, 2-beacon or 3+-beacon RSSI determination.

26. The system according to claim 18 including an adhesive material for adhering each of said portable transmitters to a respective one of said objects.

27. The system according to claim 26 wherein each of said portable transmitters includes the adhesive material permanently secured thereto so as to present an adhesive surface for securing the transmitter to the respective one of said objects.

28. The system according to claim 27 wherein the adhesive surface temporarily secures each of said transmitters to the storage member at least before first use of the transmitter.

29. The system according to claim 18 wherein each of said transmitters is switchable between a deactivated (non-transmitting) and an activated (transmitting) state.

30. The system according to claim 29 including a storage member for storing thereon each of said portable transmitters at least before first use, the storage member and the transmitter co-operating to maintain the transmitter in its deactivated state until its removal from the storage member on the first use.

31. The system according to claim 30 wherein the storage member is or includes a flexible sheet to which each transmitter is secured before first use.

32. The system according to claim 30, wherein the storage member includes a respective member that co-operate with each of said transmitters stored thereon before first use in order to maintain the deactivated state of the said transmitter.

* * * * *